United States Patent
McHugh et al.

(10) Patent No.: US 8,738,474 B1
(45) Date of Patent: May 27, 2014

(54) SYSTEM AND METHOD FOR MANAGING PRODUCT INVENTORY

(71) Applicant: W.W. Grainger, Inc., Lake Forest, IL (US)

(72) Inventors: Michael McHugh, Grayslake, IL (US); James Nicholas Finn, Palatine, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 13/774,575

(22) Filed: Feb. 22, 2013

(51) Int. Cl.
*G06Q 10/08* (2012.01)

(52) U.S. Cl.
USPC .......... 705/28; 705/16; 705/21; 705/22; 235/385; 235/451; 235/383; 340/572.1; 340/5.91; 340/10.41; 340/3.71; 700/242; 700/216

(58) Field of Classification Search
USPC .......... 705/28, 17, 18, 21; 235/385; 340/10.1, 340/10.33, 10.34, 572.1
See application file for complete search history.

(56) References Cited

U.S. PATENT DOCUMENTS

| | | | |
|---|---|---|---|
| 6,435,407 B1 * | 8/2002 | Fiordelisi | 235/383 |
| 7,321,290 B2 | 1/2008 | Stevens et al. | |
| 8,073,562 B2 * | 12/2011 | Danelski | 700/216 |
| 8,515,413 B1 * | 8/2013 | Schilit et al. | 455/419 |
| 2005/0140498 A1 * | 6/2005 | Bastian, II | 340/5.92 |
| 2005/0149226 A1 * | 7/2005 | Stevens et al. | 700/214 |
| 2007/0215700 A1 * | 9/2007 | Reznik et al. | 235/385 |
| 2008/0182512 A1 * | 7/2008 | Waters | 455/41.1 |
| 2010/0082444 A1 * | 4/2010 | Lin et al. | 705/17 |
| 2011/0166921 A1 * | 7/2011 | Degraeve et al. | 705/14.23 |
| 2011/0276511 A1 * | 11/2011 | Rosenberg | 705/345 |
| 2012/0043289 A1 | 2/2012 | Brown et al. | |

* cited by examiner

*Primary Examiner* — Vanel Frenel
(74) *Attorney, Agent, or Firm* — Greenberg Traurig, LLP (57) ABSTRACT

A system has a storage bin used to hold a product and a product storage rack intended to hold the storage bin. The storage bin is provided with a near field communication (NFC) tag device and the product storage rack is provided with a NFC antenna device cooperable with the NFC tag device. The NFC antenna device and the NFC tag device are used to determine a relative position of or orientation of the storage bin relative to the product storage rack for the purpose of automatically determining if replenishment of the product within the product storage rack is required.

14 Claims, 13 Drawing Sheets

SYSTEM AND METHOD FOR MANAGING PRODUCT INVENTORY

BACKGROUND

A two tone storage bin for use in storing product inventory is known in the art. For example, U.S. Published Application No. 2012/0043289—which is incorporated herein by reference in its entirety—discloses a storage bin that includes a body having a bottom wall and two opposed side walls, a front end wall of a first color, e.g., blue, and a rear end wall of a second color, e.g., red or orange, connected thereto. The two end walls have a height lower than a height of the side walls to form a front bin opening and a rear bin opening. A divider wall is positioned midway of the body to form a front hopper and a rear hopper, each of which is filled with a product. When the front hopper is empty and product in the bin needs replenishing, the bin is turned around so that the rear end wall of the second color faces outwardly to provide a visual indicator that replenishment of the product in the bin is needed while there is still product, e.g., safety stock, left in the rear hopper.

SUMMARY

The following describes an improved system and method for managing product inventory. The system has a storage bin used to hold a product and a product storage rack intended to hold the storage bin. The storage bin is provided with a near field communication (NFC) tag device and the product storage rack is provided with a NFC antenna device cooperable with the NFC tag device. The NFC antenna device and the NFC tag device are used to determine a relative position of or orientation of the storage bin relative to the product storage rack for the purpose of automatically determining if replenishment of the product within the product storage rack is required.

BRIEF DESCRIPTION OF THE DRAWINGS

For a better understanding of the system and method for managing product inventory described hereinafter reference may be had to preferred embodiments shown in the following drawings in which.

DETAILED DESCRIPTION

With reference to the figures, systems and methods for managing product inventory are now described.

Figure 1:
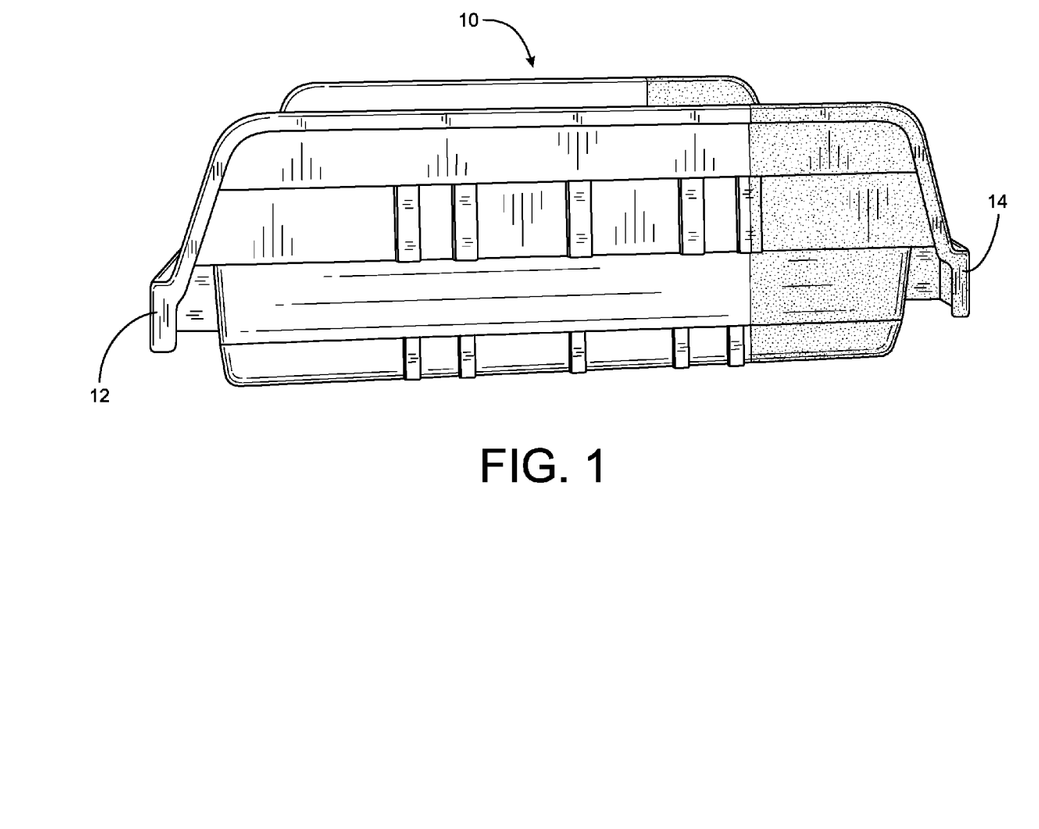
FIG. 1 is a side view of an exemplary storage bin for use in connection with the subject system and method for managing product inventory.
Figure 2:
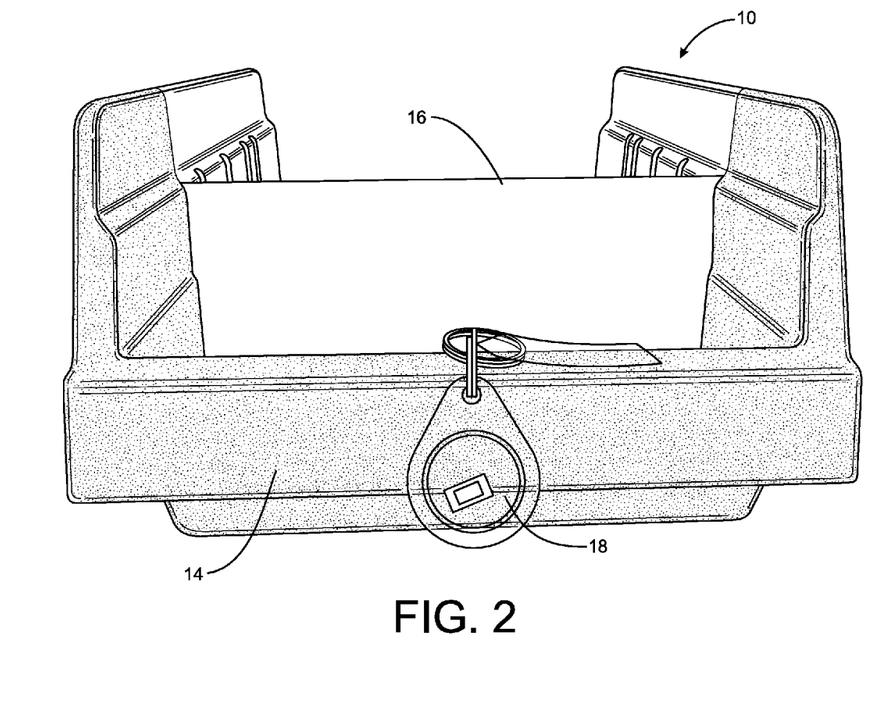
FIG. 2 illustrates a near field communication tag disposed on an end of the exemplary storage bin of FIG. 1.
Figure 3:
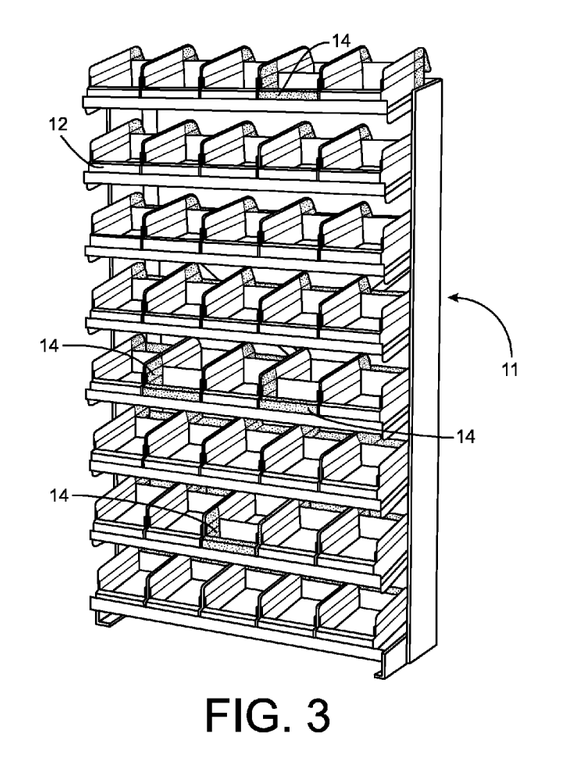
FIG. 3 illustrates storage bins of FIGS. 1 and 2 disposed within an exemplary product storage rack.

Turning to FIGS. 1-3, an exemplary storage system including a bin 10 and product storage rack 11 is illustrated. The exemplary storage bin 10 generally comprises a body having a bottom wall and two opposed side walls, a front section including a front end wall 12 having a first indicia, e.g., a first color, text, absence of text, or the like, and a rear section including a second end wall 14 having a second indicia different than the first indicia, e.g., a second color, text, absence of text, or the like, connected thereto. A divider wall 16 may be positioned intermediate the front section and the rear section of the body to form a front hopper and a rear hopper, each of which is to be filled with a product. In this manner, as described in the aforementioned U.S. Published Application No. 2012/0043289, when the front hopper is empty and product in the front hopper of the bin 10 needs replenishing, the bin 10 is turned around in the bin holding rack 11 so that the rear end wall 14 of the second color faces outwardly to provide a visual indicator that replenishment of the product in the bin 10 is needed while there is still product left in the rear hopper of the bin 10. While the exemplary colored bin 10 is preferred for use in connection with the system and method detailed hereinafter, it is to be understood that other bin forms that are intended to be moved or otherwise positionally changed relative to the product storage rack 11 can be used as needed while keeping within the spirit and scope of the invention hereinafter claimed.

As discussed above, the exemplary colored bin 10 functions to provide a visual indicator that replenishment of the product in the bin 10 is needed. As will therefore be appreciated, when an inventory system relies exclusively upon the use of such colored bins 10 a manual visual inspection of the product storage rack 11 is required in order to discern whether or not replenishment product in needed. Thus, to reduce costs, e.g., to reduce or eliminate the need for persons to manually inspect the product storage rack 11, it is proposed that the bin 10 and product storage rack 11 be provided with cooperating technologies whereby the inventory status of the bin 10 within the product storage rack 11 can be automatically discerned.

For automatically discerning the inventory status of the bin 10 within the product storage rack 11 a near field communication (NFC) tag device 18 is positioned on, within, or near an end of the bin 10 while a cooperating NFC antenna device 20 is positioned on, within, or near a surface of the product storage rack 11 in the area at which the bin 10 is intended to be held. The NFC tag device 18 can be applied to the bin 10 using any of a variety of form factors including, but not limited to, tags, stickers, key fobs, or the like, while one or more NFC antenna devices 20 can be applied to the bin holding rack 11. Furthermore, the NFC tag device 18, which may be read-only or rewriteable as desired, preferably stores data that would be usable by the system to identify the specific product that is being held within the bin 10. This data may be data that is indicative of a stock keeping unit (SKU) that is associated with the product held within the bin 10, data indicative of a bin number assigned to the bin 10, data indicative of a location for the bin 10 within the product storage rack 11 and/or the like as desired. In this manner, because the NFC antenna device 20 functions as an initiator device that actively generates an RF field that can be used to provide power to the NFC tag device 18, when the NFC tag device 18 and the NFC antenna device 20 are positioned in the vicinity of each other, i.e., the devices are within the NFC range of communication (which is typically 4 inches or less), both devices will be powered and the system and method can use such NFC peer-to-peer communication to automatically discern, using the data maintained on the NFC tag device 18, the inventory status of the bin 10. As will also be described hereinafter, the automatically discerned inventory status of the bin 10 can then be used to automatically initiate a replenishment of product within the bin 10 as desired.

Figure 4A:
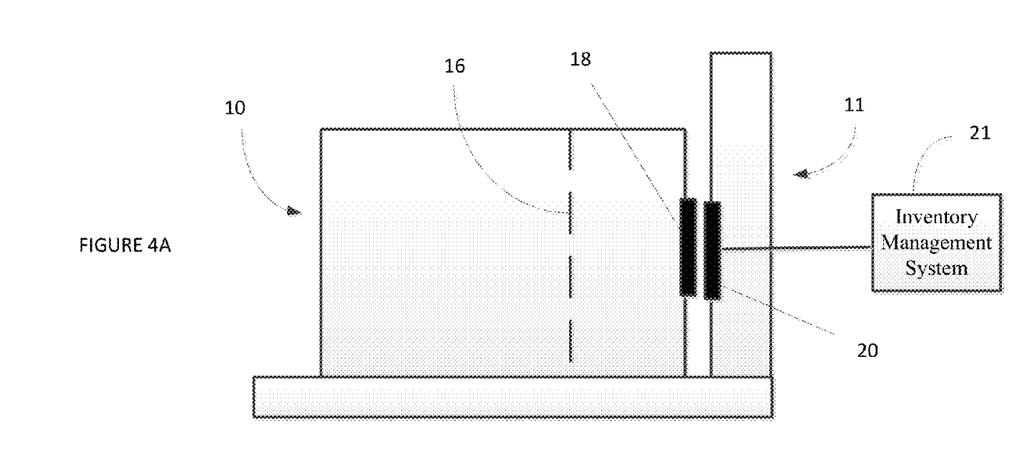
FIGS. 4A and 4B illustrate a first system in which NFC devices are used to sense an orientation of a storage bin within a product storage rack for automated inventory management purposes.
Figure 5:
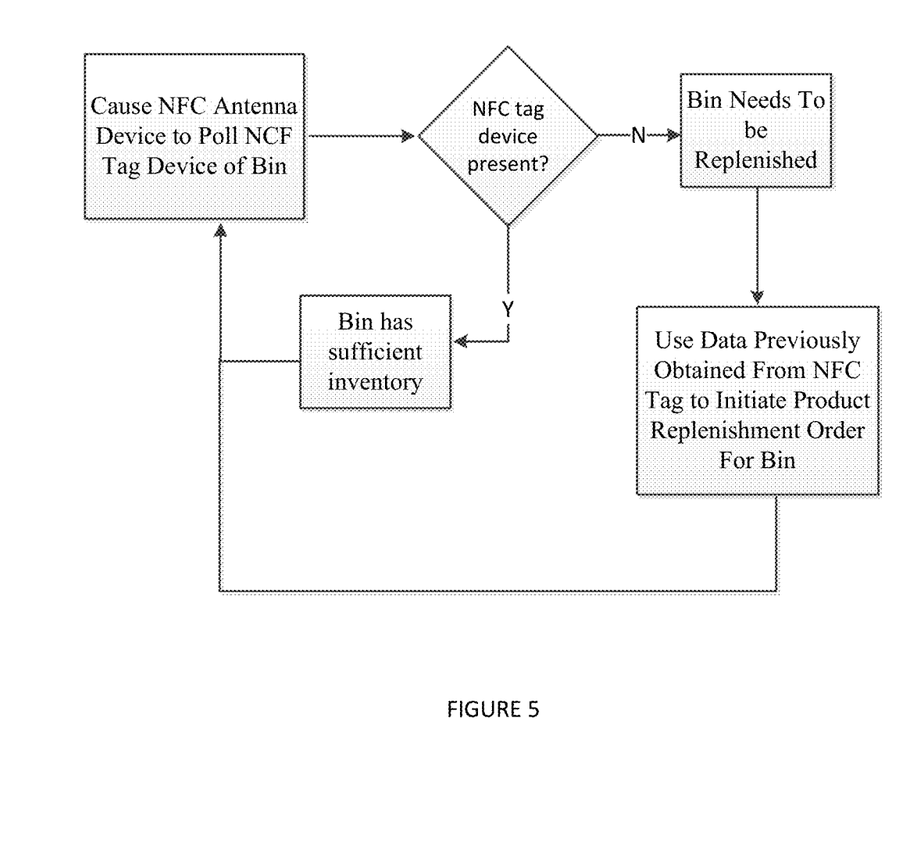
FIG. 5 illustrates an exemplary method for using NFC devices to sense an orientation of a storage bin within a product storage rack for automated inventory management purposes.

By way of more particular example, FIG. 4A illustrates an instance wherein the bin 10 has sufficient inventory of product, i.e., the bin 10 has not been turned around within the product storage rack 11 for the purpose of making the end 14 of bin 10 visible. In this instance, it will be seen that the NFC tag device 18 and the NFC antenna device 20 will be positioned adjacent to one another, i.e., the two device are within the NFC range of communication, and the NFC antenna device 20 will provide a carrier field and the NFC tag device 18 will answer by modulating the existing field to thereby communicate back to the NFC antenna device 20 (and the inventory management system 21 coupled to the NFC antenna device 20, e.g., directly, wirelessly, via a network or the like) the data that is maintained on the NFC tag device 18. While the NFC tag device 18 and the NFC antenna device 20 are thus communicating, the inventory management system 21 can thus be informed that the bin 10 currently has sufficient inventory of the product as shown in FIG. 5.

Figure 4B:
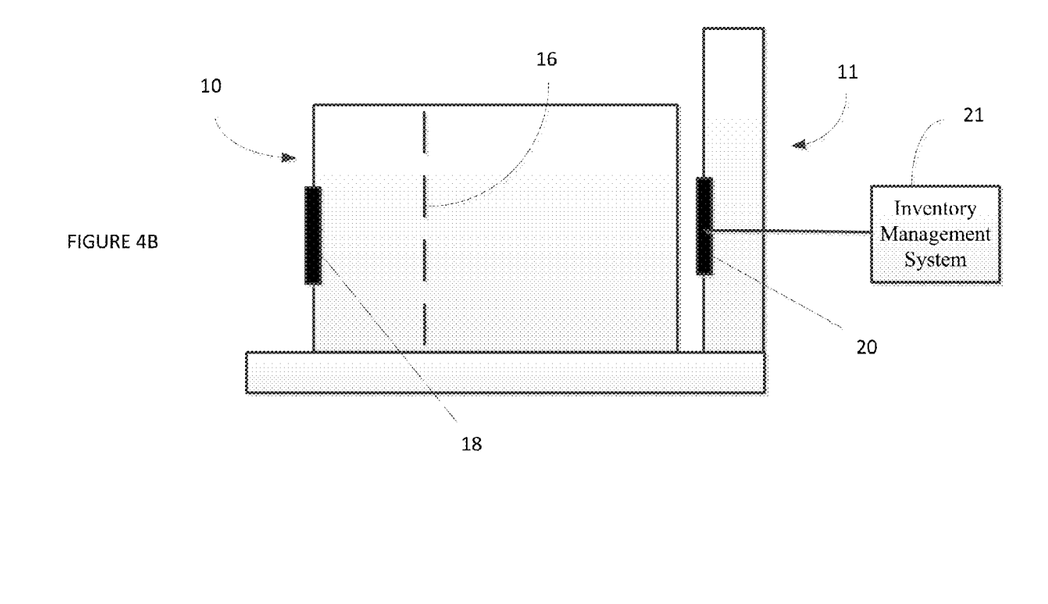

Turning now to FIG. 4B, in the instance wherein the inventory of product within bin 10 needs to be replenished, i.e., the front hopper of the bin 10 is emptied and the bin 10 has been turned within the bin holding rack 10 to provide access to the product in the back hopper and to thereby make end 14 of bin 10 visible, it will be seen that the NFC tag device 18 and the NFC antenna device 20 will be separated from one another, i.e., the two device will be outside of the NFC range of communication. In this instance the NFC tag device 18 will no longer be capable of receiving a carrier field from the NFC antenna device 20 and will no longer be capable of answering the NFC antenna device 20 to thereby communicate back to the NFC antenna device 20 (and the inventory management system 21 coupled to the NFC antenna device 20) the data that is maintained on the NFC tag device 18. While the NFC tag device 18 and the NFC antenna device 20 are thus incapable of communicating, the inventory management system 21 can thus be informed that the bin 10 is in need of product replenishment as shown in FIG. 5. As further shown in FIG. 5, when product replenishment is required, an order for product that was mapped to the data previously read from the NFC tag device 10 can be placed from a vendor of product and the product can be then delivered to the bin 10 as desired.

Figure 6A:
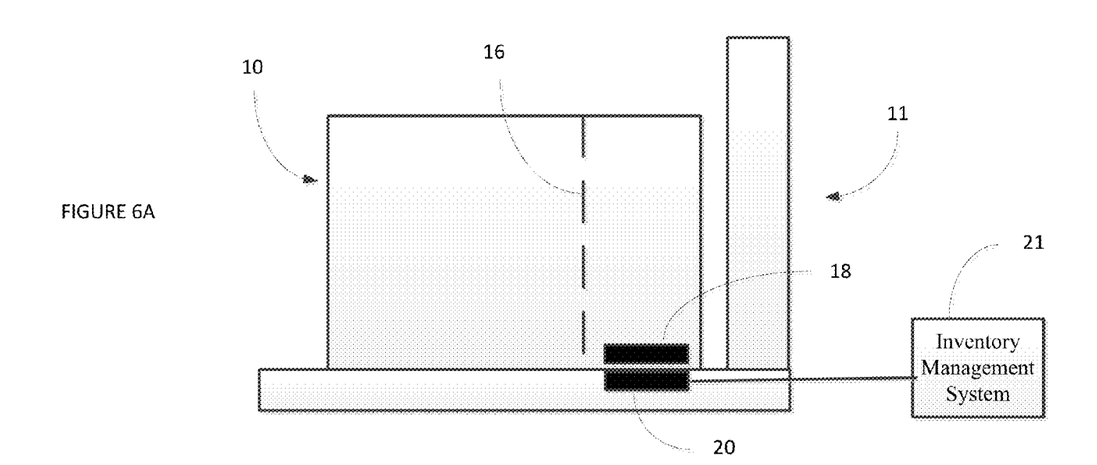
FIGS. 6A and 6B illustrate a second system in which NFC devices are used to sense an orientation of a storage bin within a product storage rack for automated inventory management purposes.
Figure 6B:
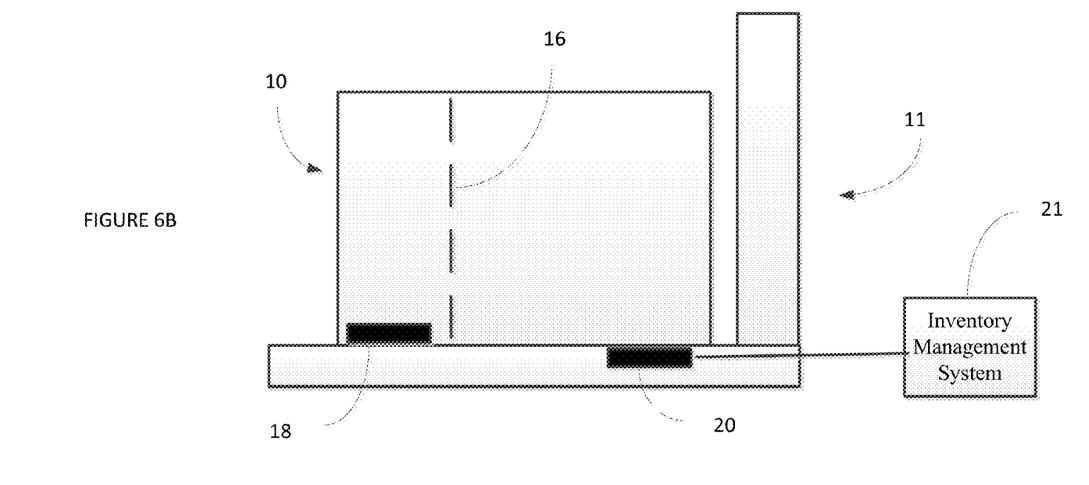

It is to be further understood that the examples illustrated in FIGS. 4A and 4B are not intended to be limiting. For example, the NFC tag device 18 and the NFC antenna device 20 can be located at other positions on the bin 10 and product storage rack 11, respectively, in keeping with the desire to have the NFC tag device 18 and the NFC antenna device 20 be in communication in a first bin orientation relative to the bin holding rack 11 and to have the NFC tag device 18 and the NFC antenna device 20 be incapable of communicating in a second bin orientation relative to the bin holding rack 11. An alternative embodiment is thus shown in FIGS. 6A and 6B for illustrative purposes only.

Figure 12A:
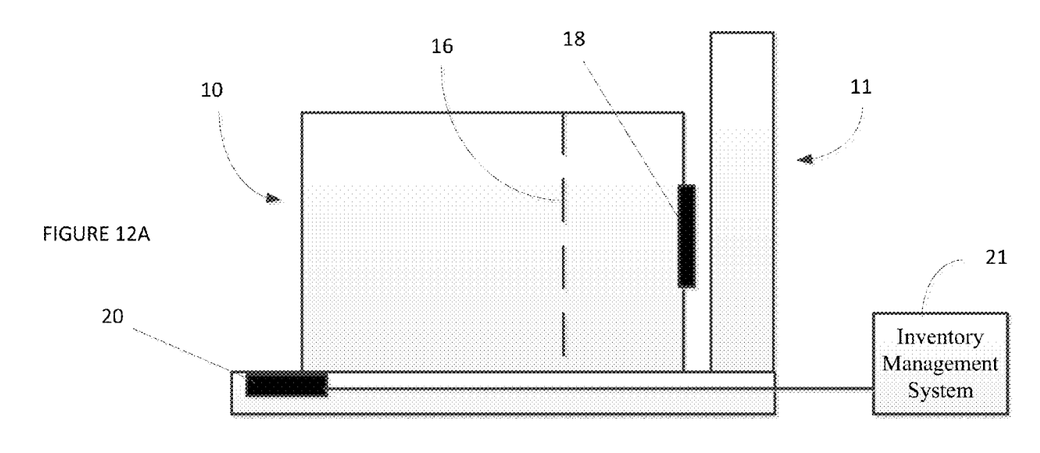
FIGS. 12A and 12B illustrate an eighth system in which NFC devices are used to sense an orientation of a storage bin within a product storage rack for automated inventory management purposes.
Figure 12B:
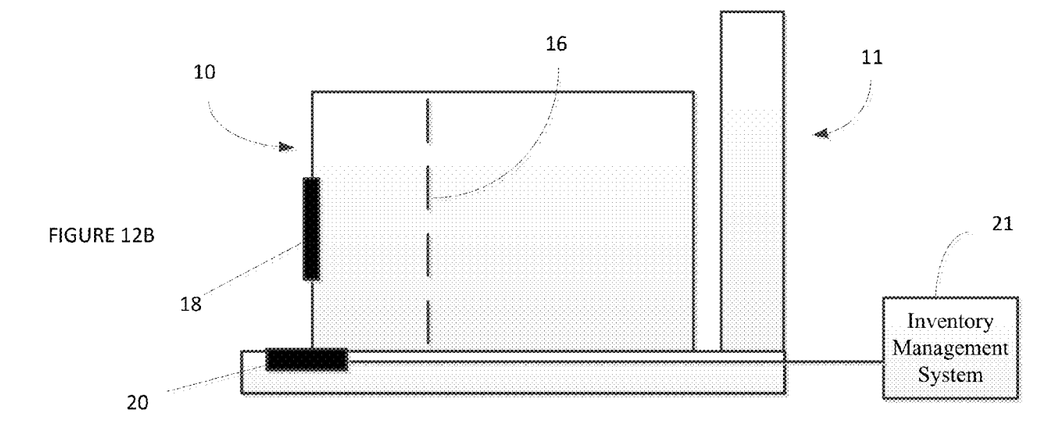
Figure 13:
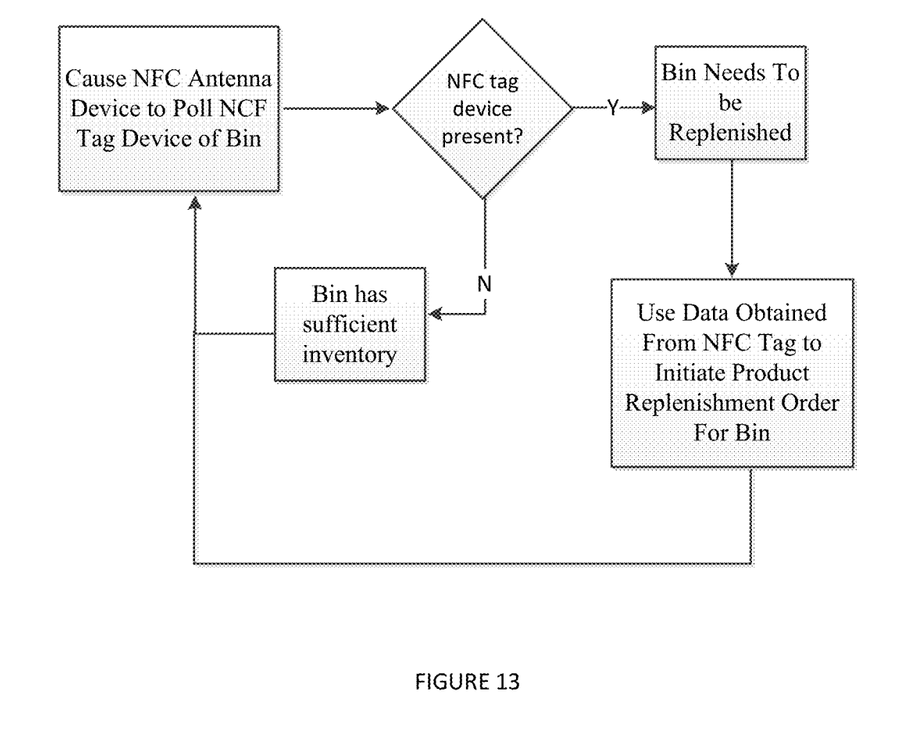
FIG. 13 illustrates an exemplary second method for using NFC devices to sense an orientation of a storage bin within a product storage rack for automated inventory management purposes.

In a yet further example shown in FIGS. 12A and 12B, FIG. 12A illustrates an instance wherein the bin 10 has sufficient inventory of product, i.e., the bin 10 has not been turned around within the product storage rack 11 for the purpose of making the end 14 of bin 10 visible. In this instance, it will be seen that the NFC tag device 18 and the NFC antenna device 20 will be separated from one another, i.e., the two device will be outside of the NFC range of communication. In this instance the NFC tag device 18 will not be capable of receiving a carrier field from the NFC antenna device 20 and will not be capable of answering the NFC antenna device 20 to thereby communicate back to the NFC antenna device 20 (and the inventory management system 21 coupled to the NFC antenna device 20) the data that is maintained on the NFC tag device 18. While the NFC tag device 18 and the NFC antenna device 20 are thus incapable of communicating, the inventory management system 21 can thus be informed that the bin 10 is not in need of product replenishment as shown in FIG. 13.

Turning now to FIG. 12B, in the instance wherein the inventory of product within bin 10 needs to be replenished, i.e., the front hopper of the bin 10 is emptied and the bin 10 has been turned within the bin holding rack 10 to provide access to the product in the back hopper and to thereby make end 14 of bin 10 visible, it will be seen that the NFC tag device 18 and the NFC antenna device 20 will be positioned adjacent to one another, i.e., the two device are within the NFC range of communication, and the NFC antenna device 20 will provide a carrier field and the NFC tag device 18 will answer by modulating the existing field to thereby communicate back to the NFC antenna device 20 (and the inventory management system 21 coupled to the NFC antenna device 20, e.g., directly, wirelessly, via a network or the like) the data that is maintained on the NFC tag device 18. While the NFC tag device 18 and the NFC antenna device 20 are thus communicating, the inventory management system 21 can thus be informed that the bin 10 is in need of product replenishment as shown in FIG. 13. As further shown in FIG. 13, when product replenishment is required, an order for product that was mapped to the data read from the NFC tag device 10 can be placed from a vendor of product and the product can be then delivered to the bin 10 as desired.

Figure 10A:
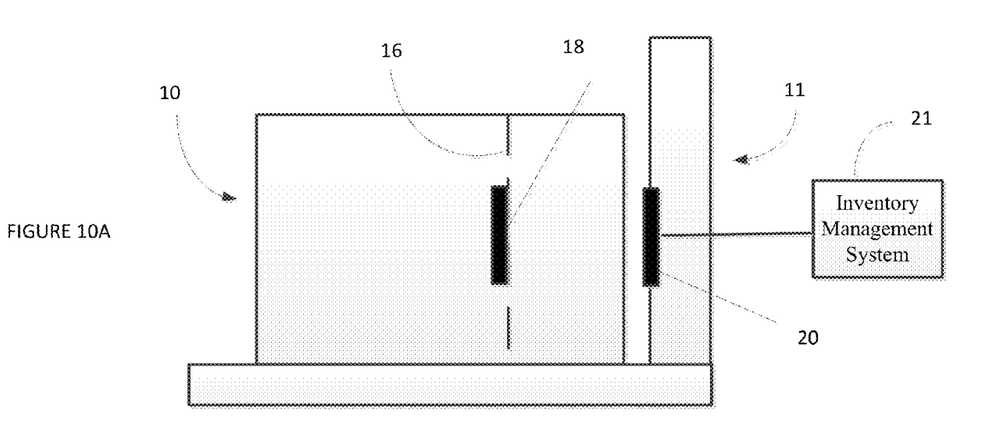
FIGS. 10A and 10B illustrate a sixth system in which NFC devices are used to sense an orientation of a storage bin and/or removal of a bin divider within a product storage rack for automated inventory management purposes.

By way of still further example, FIG. 10A illustrates an instance wherein the bin 10 has sufficient inventory of product, i.e., the bin 10 has not been turned around within the product storage rack 11 for the purpose of making the end 14 of bin 10 visible and/or the bin divider 16 remains in place within the bin 10. In this instance, it will be seen that the NFC tag device 18 and the NFC antenna device 20 will be positioned adjacent to one another, i.e., the two device are within the NFC range of communication, and the NFC antenna device 20 will provide a carrier field and the NFC tag device 18 will answer by modulating the existing field to thereby communicate back to the NFC antenna device 20 (and the inventory management system 21 coupled to the NFC antenna device 20, e.g., directly, wirelessly, via a network or the like) the data that is maintained on the NFC tag device 18. While the NFC tag device 18 and the NFC antenna device 20 are thus communicating, the inventory management system 21 can thus be informed that the bin 10 currently has sufficient inventory of the product as again shown in FIG. 5.

Figure 10B:
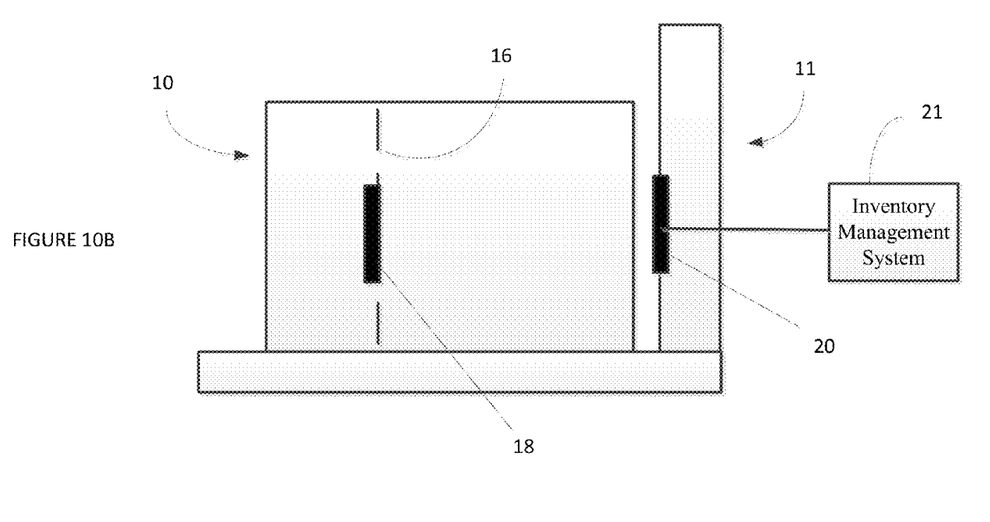

Turning now to FIG. 10B, in the instance wherein the inventory of product within bin 10 needs to be replenished, i.e., the front hopper of the bin 10 is emptied and the bin 10 has been turned within the bin holding rack 10 to provide access to the product in the back hopper and to thereby make end 14 of bin 10 visible or the bin divider 16 is removed from the bin 10 to provide access to the safety inventory (with the bin therefore not needing to be turned), it will be seen that the NFC tag device 18 and the NFC antenna device 20 will be separated from one another, i.e., the two device will be outside of the NFC range of communication. In this instance the NFC tag device 18 will no longer be capable of receiving a carrier field from the NFC antenna device 20 and will no longer be capable of answering the NFC antenna device 20 to thereby communicate back to the NFC antenna device 20 (and the inventory management system 21 coupled to the NFC antenna device 20) the data that is maintained on the NFC tag device 18. While the NFC tag device 18 and the NFC antenna device 20 are thus incapable of communicating, the inventory management system 21 can thus be informed that the bin 10 is in need of product replenishment as likewise shown in FIG. 5.

Figure 11A:
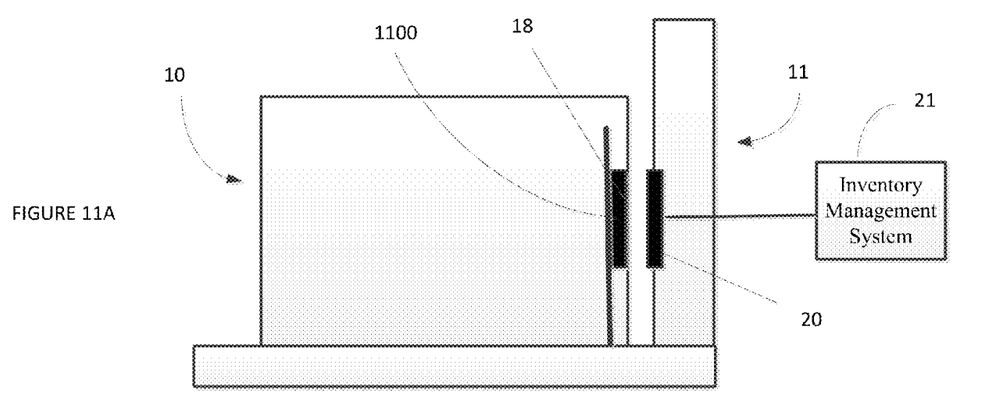
FIGS. 11A and 11B illustrate a seventh system in which NFC devices are provided to a bin removable card and a product storage rack for automated inventory management purposes.
Figure 11B:
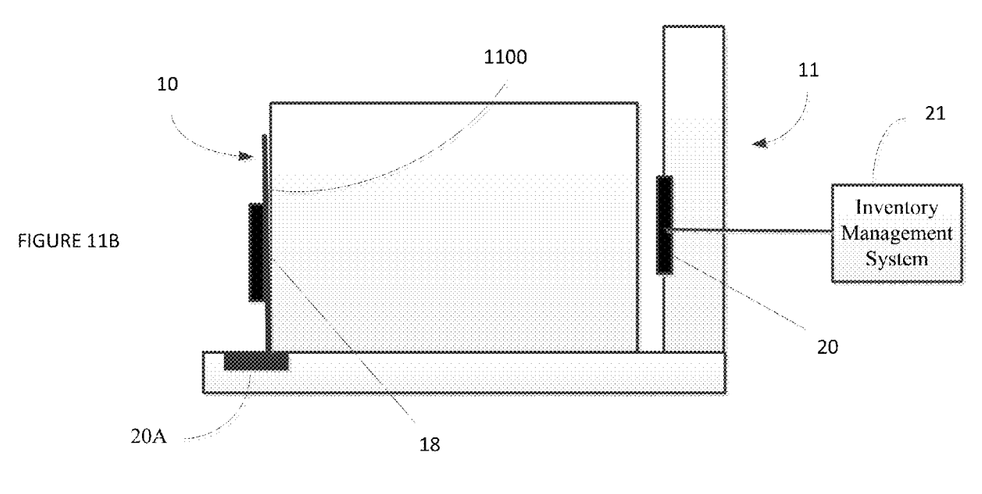

In FIGS. 11A and 11B, it is further contemplated that the NFC tag device 18 could be placed on a card 1100 or the like that is associated with the bin 10. The card 1100 can be imprinted with a label, e.g., "reordered," or otherwise provided with indicia, e.g., a color, to inform a viewer of a given condition with respect to the bin/inventory within the bin. In a first example, the card 1100 having an NFC tag device 18 can be positioned in the bin 10 in a first position which would be in the vicinity of the NFC antenna device 20 as shown in FIG. 11A where the proximity of the NFC tag device 18 to the NFC antenna device 20 would be sensed as described above. When the state of the bin changes, the card 1100 can then be removed from the bin 10 or otherwise repositioned with respect to the bin 10 as shown in FIG. 11B (where the indicia provided to the card may be made visible to a viewer) whereupon the NFC tag device 18 and NFC antenna device 20 will no longer be able to communicate. Inventory processing responsive to the inability of the NFC devices to communicate can then take place as described above. In lieu of or in addition to the NFC antenna device 20, an NFC antenna device 20A can be located in the vicinity where the card 1100 is to be positioned such that the establishment of communication between the NFC antenna device 20A and the NFC tag device 18 can be used by the system 21 for inventory tracking and fulfillment responses as generally illustrated in FIG. 13 and described above.

In still further circumstances, it is contemplated that the withdrawn bin divider 16 or card 1100 is intended to be passed in front of a centralized station having an NFC antenna device 20 whereupon data captured from the NFC tag device will be used by the system 21 to provide replenishment services as generally illustrated in FIG. 13 and described above. After the bin divider 16 or card 1100 is passed in front of the centralized station having the NFC antenna device 20, the bin divider 16 or the card 1100 can be returned to the bin as desired (e.g., slid into a sleeve on the front of the bin 10 to thereby indicate that a reorder request has been placed).

While the foregoing illustrates examples in which the system uses a reorientation of a bin 10, bin element, or the like in the product storage rack 11 (wherein the bin, bin element, or the like is reoriented for the purpose of accessing product stored in the back portion of the bin 10 or to otherwise signal that replenishment is needed) to automatically discern the product inventory status within the bin 10, systems in which the above-described NFC devices are used to automatically discern product inventory status within bins 10 that are intended to be repositioned within a product storage rack 11 are also contemplated.

Figure 7:
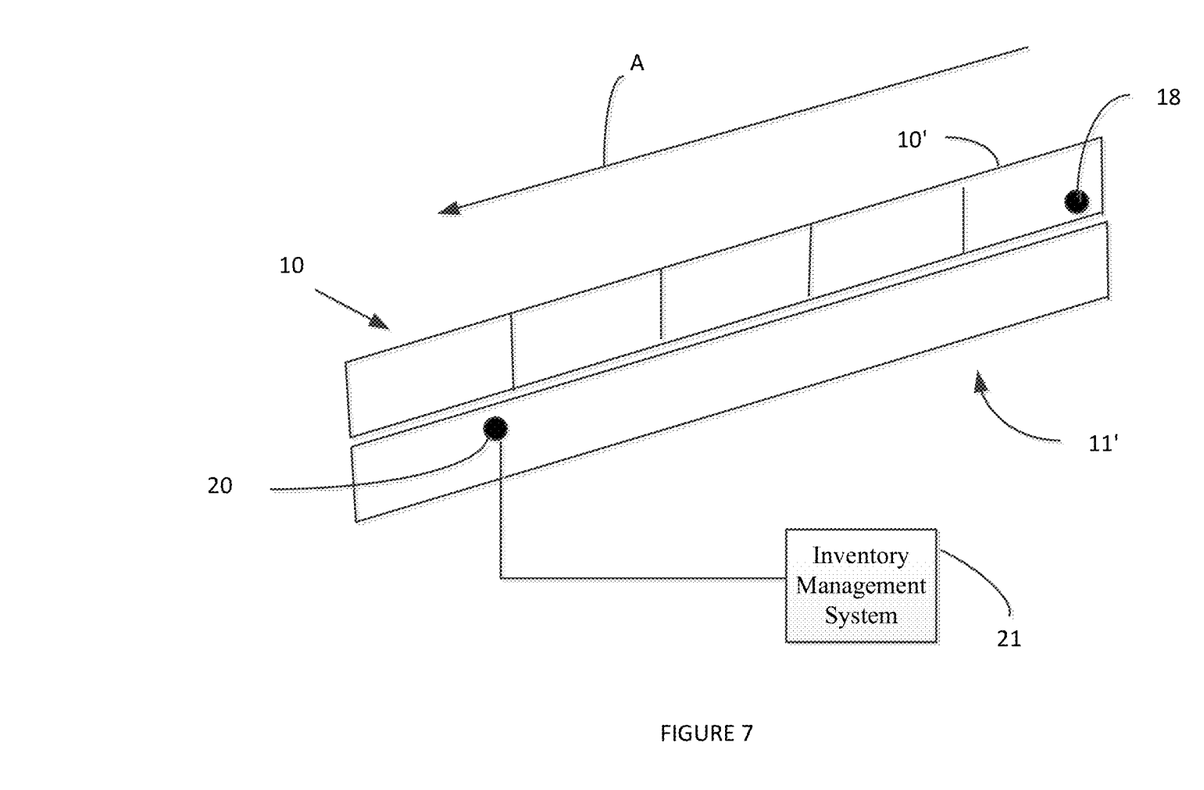
FIG. 7 illustrates a third system in which NFC devices are used to sense movement of a storage bin within a product storage rack for automated inventory management purposes.

By way of example only, FIG. 7 illustrates a product storage rack 11' in which bins 10 are intended to removed from a front of the product storage rack 11' after the product within each bin 10 is exhausted with the remaining bin(s) 10, i.e., the bin(s) still holding product, then being moved forward towards the front of the product storage rack 11' as generally indicated by the arrow A. As further illustrated in FIG. 7, a predetermined one or more of the bins 10, e.g., bin 10', can be provided with a NFC tag device 18 as described above while one or more predetermined locations on the product storage rack 11' can be provided with a NFC antenna device 20 as described above. In this manner, when the bin 10' is caused to be moved to a location within the product storage rack 11' as result of the bins 10 located in front thereof being exhausted of product, the NFC tag device 18 of bin 10' will eventually end up in a position within the product storage rack 11' at which the NFC tag device 18 and the NFC antenna device 20 will be able to have NFC communications. The inventory management system 21 can then use data obtained from the NFC tag device(s) 18, e.g., data indicative of a bin number, data indicative of product within the bin, etc., and the discerned status of the bin(s) 10', e.g., the arrival of a bin 10' at (and/or the departure of the bin 10' from) the predetermined location(s) within the product storage rack 11' at which the NFC tag device 18 of the bin 10' and an NFC antenna 20 of the product storage rack 11' are capable of having NFC communication, to intelligently determine the status of the bins 10 within the product storage rack 11' and, thereby, determine if product associated with the bins 10 is in need of replenishment as described above.

Figure 8:
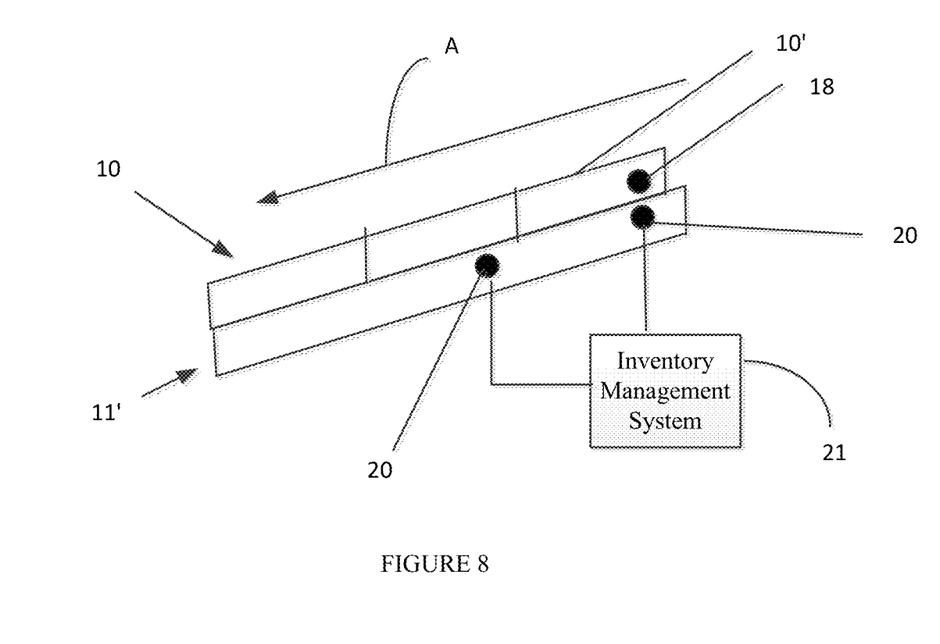
FIG. 8 illustrates a fourth system in which NFC devices are used to sense movement of a storage bin within a product storage rack for automated inventory management purposes.

In keeping with this example, FIG. 8 illustrates a system in which plural NFC antenna devices 20 are used to track the movement of one or more bins 10' within the product storage rack 11'. As a bin 10' is caused to move into and out of NFC communication range of NFC antenna devices 20 located at predetermined positions within the product storage rack 11' data captured from the NFC tag device 18 associated with the bin 10' and the status of the bin 10' relative to the NFC antenna devices 20, e.g., at the predetermined location or removed from the predetermined location, can be used by the inventory control system 21 to intelligently discern the product inventory status within the bins 10 as described above.

Figure 9:
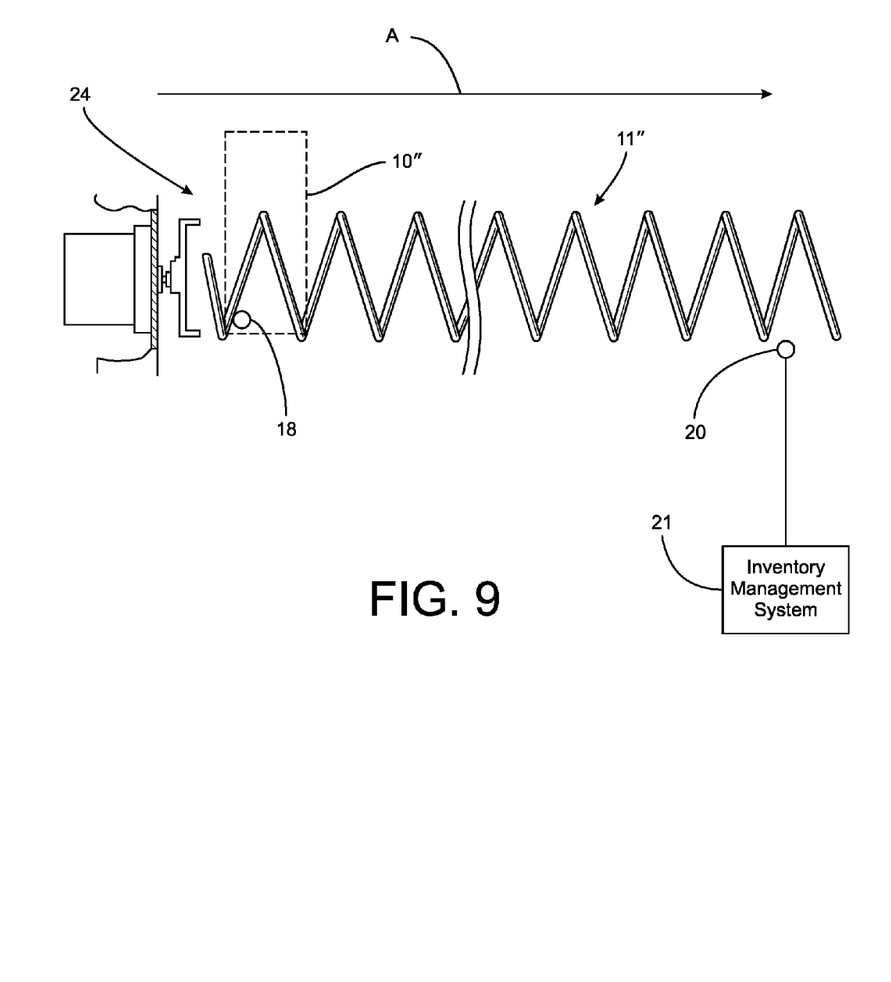
FIG. 9 illustrates a fifth system in which NFC devices are used to sense movement of a storage bin within a product storage rack for automated inventory management purposes.

In still keeping with this example, FIG. 9 illustrates a product storage rack 11" in which a motor controlled coil device 24 or the like is used to move product inventory in a predetermined direction A in the manner of a conventional vending machine. In this example, a unit 10" is provided with an NFC tag device 18 while one or more NFC antenna devices 20 are positioned are predetermined locations within the product storage rack 11". Again, as the unit 10" is caused to be moved in the direction A as product is withdrawn from the product storage rack 11" the NFC tag device 18 of unit 10"

will eventually end up in a position within the product storage rack 11" at which the NFC tag device 18 and the NFC antenna device 20 will be able to have NFC communications. The inventory management system 21 can then use data obtained from the NFC tag device(s) 18, e.g., data indicative of product within the coil, and the discerned status of the bin(s) 10", e.g., the arrival of a bin 10" at (and/or the departure of the bin 10" from) the predetermined location(s) within the product storage rack 11" at which the NFC tag device 18 of the bin 10' and an NFC antenna 20 of the product storage rack 11" are capable of having NFC communication, to intelligently determine if product associated with the coil device 24 is in need of replenishment as described above.

While various embodiments of the invention have been described in detail, it will be appreciated by those skilled in the art that various modifications and alternatives to those details could be developed in light of the overall teachings of the disclosure. For example, it will be appreciated that other binary type sensing devices can be utilized to determine positioning of a bin 10 relative to the product storage rack 11 for this same purpose. Such binary type sensing devices can include photodetectors that are adapted to sense the presence or absence of a particular color (e.g., the front color or rear color of the bin), photodetectors that are adapted to sense the presence or absence of a bine 10, etc. Accordingly, the particular arrangement disclosed is meant to be illustrative only and not limiting as to the scope of the invention which is to be given the full breadth of the appended claims and any equivalents thereof.

What is claimed is:

1. A method for providing automated inventory management in a system having a storage bin used to hold a product wherein the storage bin is provided with a near field communication (NFC) tag device and a product storage rack intended to hold the storage bin wherein the product storage rack is provided with a NFC antenna device cooperable with the NFC tag device, comprising:
   using the NFC antenna device and the NFC tag device to determine if the storage bin is in placed into a first orientation relative to the product storage rack wherein the product storage bin is caused to be moved into the first orientation when the product needs to be replenished with the storage bin; and
   when it is determined that the storage bin has been placed into the first orientation relative to the product storage rack using data read from the NFC tag device to automatically initiate a replenishment of the product within the product storage rack.

2. The method as recited in claim 1, wherein the storage bin has a first end having indicia which functions to provide a visible indication that the product within the storage bin needs to be replenished and wherein the first orientation of the bin relative to the product storage rack comprises the storage bin being turned such that the first end of the storage bin is rendered visible within the product storage rack.

3. The method as recited in claim 2, wherein a detected an absence of NFC communication between the NFC tag device and the NFC antenna device is indicative of the storage bin having been placed into the first orientation relative to the product storage rack.

4. The method as recited in claim 2, wherein a detected NFC communication between the NFC tag device and the NFC antenna device is indicative of the storage bin being in a second orientation relative to the product storage rack, the second orientation being exclusive of the first orientation.

5. The method as recited in claim 2, wherein the first end of the storage bin carries the NFC tag device.

6. The method as recited in claim 2, wherein the data read from the NFC tag device comprises data indicative of a stock keeping unit (SKU) of the product.

7. The method as recited in claim 2, wherein the data read from the NFC tag device comprises data indicative of an identifier assigned to the storage bin.

8. The method as recited in claim 1, wherein the data read from the NFC tag device comprises data indicative of a stock keeping unit (SKU) of the product.

9. The method as recited in claim 1, wherein the data read from the NFC tag device comprises data indicative of an identifier assigned to the storage bin.

10. The method as recited in claim 1, wherein the data read from the NFC tag device comprises data indicative of an identifier assigned to the storage bin.

11. A method for providing automated inventory management in a system having a storage bin used to hold a product wherein the storage bin is provided with a near field communication (NFC) tag device and a product storage rack intended to hold the storage bin wherein the product storage rack is provided with a NFC antenna device cooperable with the NFC tag device, comprising:
   using the NFC antenna device and the NFC tag device to determine if the storage bin is positioned at a predetermined location within the product storage rack wherein the product storage bin is caused to be moved towards the predetermined location in response to the product being removed from the product storage rack; and
   when it is determined that the storage bin is located at the predetermined location within the product storage rack using data read from the NFC tag device to automatically initiate a replenishment of the product within the product storage rack.

12. The method as recited in claim 11, wherein a detected NFC communication between the NFC tag device and the NFC antenna device is indicative of the storage bin being positioned at the predetermined location within the product storage rack.

13. The method as recited in claim 11, wherein the product storage rack comprises a vending machine and wherein the storage bin is automatically caused to be to be moved towards the predetermined location in response to the product being removed from the product storage rack.

14. The method as recited in claim 11, wherein the data read from the NFC tag device comprises data indicative of a stock keeping unit (SKU) of the product.

* * * * *